US012594993B2

(12) United States Patent (10) Patent No.: US 12,594,993 B2

Teramachi (45) Date of Patent: Apr. 7, 2026

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventor: Tomotaka Teramachi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 63 days.

(21) Appl. No.: 18/589,458

(22) Filed: Feb. 28, 2024

(65) Prior Publication Data

US 2024/0308586 A1 Sep. 19, 2024

(30) Foreign Application Priority Data

Mar. 15, 2023 (JP) ................................. 2023-040948

(51) Int. Cl.
| | |
|---|---|
| *B62D 15/02* | (2006.01) |
| *B60W 10/20* | (2006.01) |
| *B60W 30/10* | (2006.01) |
| *B60W 30/18* | (2012.01) |
| *G06V 20/58* | (2022.01) |
| *G08G 1/16* | (2006.01) |

(52) U.S. Cl.
CPC ......... *B62D 15/0255* (2013.01); *B60W 10/20* (2013.01); *B60W 30/10* (2013.01); *B60W 30/18163* (2013.01); *G06V 20/58* (2022.01); *G08G 1/167* (2013.01)

(58) Field of Classification Search
CPC ... B62D 15/0255; B60W 10/20; B60W 30/10; B60W 30/18163; B60W 60/001; G06V 20/58; G06G 1/167

USPC .......................................................... 701/41
See application file for complete search history.

(56) References Cited

U.S. PATENT DOCUMENTS

2019/0227544 A1* 7/2019 Aoki ............... B60W 30/18163
2024/0157945 A1* 5/2024 Fukaya ................. B60W 50/14

FOREIGN PATENT DOCUMENTS

JP 2019-127194 8/2019
JP 2021-091394 6/2021

OTHER PUBLICATIONS

Japanese Office Action for Japanese Patent Application No. 2023-040948 dated Nov. 12, 2024.

* cited by examiner

*Primary Examiner* — Yi-Kai Wang

(74) *Attorney, Agent, or Firm* — Amin, Turocy & Watson, LLP

(57) ABSTRACT

A vehicle control device recognizes a surrounding situation of a vehicle, controls steering of the vehicle such that the vehicle proceeds along a route on the basis of the surrounding situation and the route along which the vehicle is scheduled to proceed, determines whether or not to cause the vehicle to make a lane change from a traveling lane in which the vehicle is traveling to a branch lane branching from the traveling lane on the basis of a situation on a road shoulder in front of the branch lane when the vehicle is scheduled to proceed from the traveling lane to the branch lane, causes the vehicle to automatically make the lane change when it is determined to make the lane change, and causes the vehicle not to automatically make the lane change when it is determined not to make the lane change.

10 Claims, 12 Drawing Sheets

FIG. 9

| OB1 | | |
|---|---|---|
| (1) | UNREGISTERED OBJECT | ○ |
| (2) | WITHIN SEARCH RANGE | ○ |
| (3) | OBJECT WHOSE ATTRIBUTE IS VEHICLE | ○ |
| (4) | DEGREE OF RELIABILITY EQUAL TO OR HIGHER THAN THRESHOLD | ○ |
| (5) | SPEED EQUAL TO OR LOWER THAN THE THRESHOLD | ○ |

FIG. 10

<u>192</u>                                                              EACH TIME

| CONDITIONS OBJECT | (1) | (2) | (3) | (4) | (5) |
|---|---|---|---|---|---|
| OB1 | ○ | ○ | ○ | ○ | ○ |
| OB2 | ○ | ○ | ○ | ○ | ○ |
| OB3 | ○ | ○ | ○ | ○ | ○ |
| OB4 | ○ | ○ | ○ | ○ | ○ |
| OB5 | ○ | ○ | ○ | ○ | ○ |
| OB6 | ○ | ○ | ○ | ○ | ○ |

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2023-040948, filed Mar. 15, 2023, the content of which is incorporated herein by reference.

BACKGROUND

Field

The present invention relates to a vehicle control device, a vehicle control method, and a storage medium.

Description of Related Art

In recent years, efforts to provide sustainable transportation systems taking various situations into account have become active. In order to realize this goal, the efforts are focused on research and development for further improvement in traffic safety and convenience through research and development related to driving support technology. For example, a control device that acquires congestion information utilizing communication and provides information to a driver on the basis of the acquired congestion information was disclosed (Japanese Unexamined Patent Application, First Publication No. 2021-91394).

SUMMARY

Control devices in the related art cannot realize favorable vehicle control for a driver in some cases. For example, since congestion information is not real-time information, vehicle control suited to a real-time surrounding situation of a vehicle is not realized in some cases.

The present invention has been made in consideration of such circumstances, and an object thereof is to provide a vehicle control device capable of realizing favorable vehicle control for a driver, a vehicle control method, and a storage medium. For example, vehicle control suitable for a real-time situation of a vehicle is realized, and this ultimately contributes to development of sustainable transportation systems.

A vehicle control device, a vehicle control method, and a storage medium according to this invention employ the following constitutions.

(1): According to an aspect of this invention, a vehicle control device includes a storage medium storing computer-readable instructions; and at least one processor connected to the storage medium. The processor executes the computer-readable instructions to: recognize a surrounding situation of a vehicle; control steering of the vehicle such that the vehicle proceeds along a route on the basis of the surrounding situation and the route along which the vehicle is scheduled to proceed; determine whether or not to cause the vehicle to make a lane change from a traveling lane in which the vehicle is traveling to a branch lane branching from the traveling lane on the basis of a situation on a road shoulder in front of the branch lane when the vehicle is scheduled to proceed from the traveling lane to the branch lane; cause the vehicle to automatically make the lane change when it is determined to make the lane change; and cause the vehicle not to automatically make the lane change when it is determined not to make the lane change.

(2): According to the aspect of the foregoing (1), the processor executes the computer-readable instructions to: cause the vehicle to automatically make the lane change when a road shoulder in front of the branch lane is not congested; and cause the vehicle not to automatically make the lane change when a road shoulder in front of the branch lane is congested.

(3): According to the aspect of the foregoing (2), the processor executes the computer-readable instructions to: acquire a situation of the congestion in a region of the road shoulder from a connection starting position between the traveling lane and the branch lane to a location in front at a first predetermined distance on the basis of the recognized surrounding situation.

(4): According to the aspect of the foregoing (3), the processor executes the computer-readable instructions to: set the first predetermined distance to a distance varying depending on a speed of the vehicle.

(5): According to the aspect of the foregoing (4), the processor executes the computer-readable instructions to: set the first predetermined distance to be longer as the speed of the vehicle increases.

(6): According to the aspect of the foregoing (1), the processor executes the computer-readable instructions to: repeat processing of determining whether or not to cause the vehicle to make a lane change from the traveling lane to the branch lane on the basis of whether or not a road shoulder in front of the branch lane is congested when the vehicle is scheduled to proceed to the branch lane; and determine to cause the vehicle not to automatically make a lane change when it is judged that the congestion has occurred and the vehicle has reached a location within a predetermined distance from a tail end of the congestion or when it is judged that the congestion has occurred and the vehicle has reached the tail end of the congestion.

(7): According to the aspect of the foregoing (6), the processor executes the computer-readable instructions to: continue to cause the vehicle not to automatically make the lane change even when it is judged that the congestion has not occurred after it is determined to cause the vehicle not to automatically make a lane change.

(8): According to the aspect of the foregoing (7), the processor executes the computer-readable instructions to: continue to cause the vehicle not to automatically make the lane change until the vehicle passes a predetermined position in the branch lane even when it is judged that the congestion has not occurred after it is determined to cause the vehicle not to automatically make a lane change, and restart the processing of causing the vehicle to automatically make a lane change after having passed the predetermined position.

(9): According to any one of the aspects of the foregoing (2) to (8), the processor executes the computer-readable instructions to: judge that the congestion has occurred when a predetermined number or more of different vehicles are present in a region of the road shoulder.

(10): According to any one of the aspects of the foregoing (2) to (8), the processor executes the computer-readable instructions to: judge that the congestion has occurred when a plurality of different vehicles are present in a queue in a region of the road shoulder and a length of a convoy of the different vehicles present in the queue is equal to or longer than a second setting distance.

(11): According to any one of the aspects of the foregoing (2) to (8), the processor executes the computer-readable instructions to: cause an information output device to output information notifying a driver of the vehicle of an operation of steering to be performed without causing the vehicle to automatically make the lane change when it is determined not to make the lane change.

(12): According to another aspect of the present invention, a vehicle control method in which a computer executes processing of recognizing a surrounding situation of a vehicle, processing of controlling steering of the vehicle such that the vehicle proceeds along a route on the basis of the surrounding situation and the route along which the vehicle is scheduled to proceed, processing of determining whether or not to cause the vehicle to make a lane change from a traveling lane in which the vehicle is traveling to a branch lane branching from the traveling lane on the basis of a situation on a road shoulder in front of the branch lane when the vehicle is scheduled to proceed from the traveling lane to the branch lane, processing of causing the vehicle to automatically make the lane change when it is determined to make the lane change, and processing of causing the vehicle not to automatically make the lane change when it is determined not to make the lane change.

(13): According to another aspect of the present invention, a non-transitory computer storage medium stores a program for causing a computer to execute processing of recognizing a surrounding situation of a vehicle, processing of controlling steering of the vehicle such that the vehicle proceeds along a route on the basis of the surrounding situation and the route along which the vehicle is scheduled to proceed, processing of determining whether or not to cause the vehicle to make a lane change from a traveling lane in which the vehicle is traveling to a branch lane branching from the traveling lane on the basis of a situation on a road shoulder in front of the branch lane when the vehicle is scheduled to proceed from the traveling lane to the branch lane, processing of causing the vehicle to automatically make the lane change when it is determined to make the lane change, and processing of causing the vehicle not to automatically make the lane change when it is determined not to make the lane change.

According to the aspect of (1) to (13), in the vehicle control device, the vehicle control method, and the storage medium, since it is determined whether or not to cause the vehicle to automatically make the lane change and vehicle control suited to determination results is performed on the basis of the situation on a road shoulder in front of the branch lane, favorable vehicle control for a driver can be realized. For example, when the road shoulder is congested, the present invention provides support such that a vehicle makes a smooth lane change by an operation of a driver without performing control for a lane change.

According to the aspect of (4) or (5), the vehicle control device can realize control suited to a vehicle speed. For example, the vehicle control device can suspend automatic lane change at an appropriate timing.

According to the aspect of (6), since the vehicle control device suspends a lane change at a position corresponding to the tail end of congestion, it is easy for a driver to be able to understand that the suspension is caused due to congestion.

According to the aspect of (7), since the vehicle control device continues the suspension even when it is judged that congestion has not occurred after an automatic lane change of a host vehicle is suspended, repetition of suspending and restarting can be curbed and confusion of a driver can be curbed.

According to the aspect of (8), since the vehicle control device restarts processing of automatically making a lane change after passing a predetermined position, congestion can be appropriately judged. For example, it is possible to perform judgment with respect to congestion after a host vehicle has passed the predetermined position.

BRIEF DESCRIPTION OF THE DRAWINGS

FIG. 9 is an explanatory view of registration target vehicles.

FIG. 10 is a view showing an example of details of vehicle information.

DETAILED DESCRIPTION

Hereinafter, with reference to the drawings, an embodiment of a vehicle control device, a vehicle control method, and a storage medium of the present invention will be described.

Embodiment

[Overall Constitution]

Figure 1:
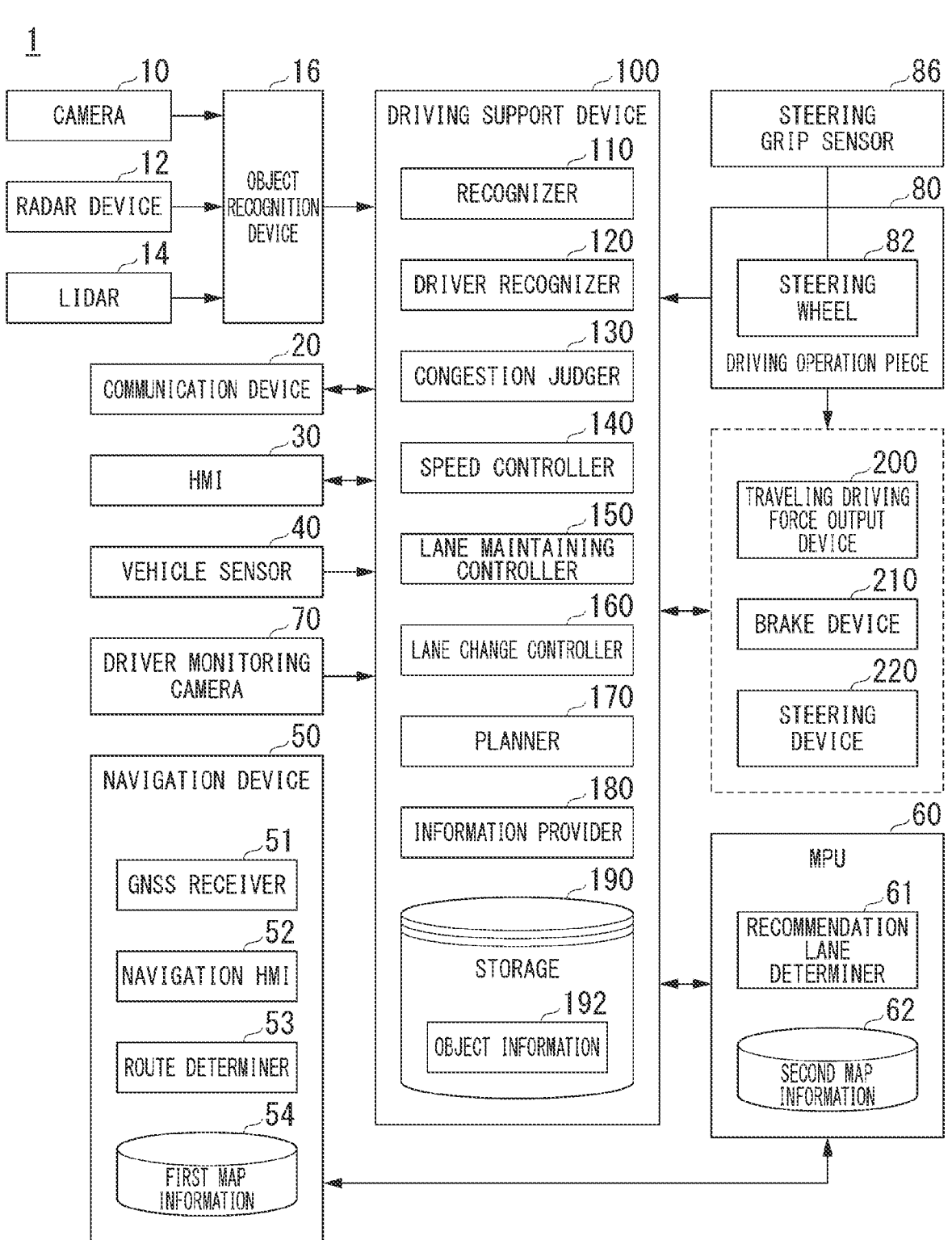
FIG. 1 is a view of a constitution of a vehicle system 1 utilizing a vehicle control system according to an embodiment.

FIG. 1 is a view of a constitution of a vehicle system 1 utilizing a vehicle control system according to the embodiment. A vehicle having the vehicle system 1 mounted therein is a vehicle, for example, with two wheels, three wheels, four wheels, or the like, and a drive source thereof is an internal-combustion engine such as a diesel engine or a gasoline engine, an electric motor, or a combination of these. An electric motor is operated using generated power by a generator connected to an internal-combustion engine, or discharge power of a secondary battery or a fuel cell.

For example, the vehicle system 1 includes a camera 10, a radar device 12, a light detection and ranging (LIDAR) 14, an object recognition device 16, a communication device 20, a human machine interface (HMI) 30, a vehicle sensor 40, a navigation device 50, an MPU 60, a driver monitoring camera 70, a driving operation piece 80, a driving support device 100, a traveling driving force output device 200, a brake device 210, and a steering device 220. These devices and instruments are connected to each other by a multiplex communication line such as a controller area network (CAN) communication line, a serial communication line, a wireless communication network, or the like. The constituents shown in FIG. 1 are merely an example. Some of the constituents may be omitted, and other constituents may further be added thereto. The driving support device 100 is an example of "a vehicle control device".

For example, the camera 10 is a digital camera utilizing a solid-state image capturing element such as a charge coupled device (CCD) or a complementary metal oxide semiconductor (CMOS). The camera 10 is attached to an arbitrary location in a vehicle having the vehicle system 1 mounted therein (hereinafter, a host vehicle M). When images of the side in front are captured, the camera 10 is attached to an upper part of a front windshield, a rear surface of a rearview mirror, or the like. For example, the camera 10 captures images around the host vehicle M periodically and repeatedly. The camera 10 may be a stereo camera.

The radar device 12 radiates radio waves such as millimeter waves around the host vehicle M and detects at least a position (distance and azimuth) of an object by detecting radio waves (reflected waves) reflected by the object. The radar device 12 is attached to an arbitrary location in the host vehicle M. The radar device 12 may detect the position and the speed of an object by a frequency modulated continuous wave (FM-CW) method.

The LIDAR 14 emits light (or electromagnetic waves having wavelengths close to that of light) around the host vehicle M and measures scattered light. The LIDAR 14 detects the distance to a target on the basis of the time from light emission to light reception. For example, emitted light is pulsed laser light. The LIDAR 14 is attached to an arbitrary location in the host vehicle M.

The object recognition device 16 recognizes the position, the kind, the speed, and the like of an object by performing sensor fusion processing with respect to detection results of some or all of the camera 10, the radar device 12, and the LIDAR 14. The object recognition device 16 outputs recognition results to the driving support device 100. The object recognition device 16 may output the detection results of the camera 10, the radar device 12, and the LIDAR 14 to the driving support device 100 without any change. The object recognition device 16 may be omitted from the vehicle system 1.

For example, the communication device 20 communicates with different vehicles present around the host vehicle M utilizing a cellular network, a Wi-Fi network, Bluetooth (registered trademark), dedicated short range communication (DSRC), or the like or communicates with various server devices via a wireless base station.

The HMI 30 provides various information to an occupant of the host vehicle M and receives an input operation of the occupant. The HMI 30 includes various display devices, a speaker, a buzzer, a touch panel, a switch, a key, and the like. The HMI 30 includes a display device. For example, the display device (display) is a display device that is a so-called multi-information display provided in a central part of an instrument panel of the host vehicle M and displays various information on the host vehicle M, such as a speed indicator (speedometer) showing a traveling speed of the host vehicle M or a rotational speed indicator (tachometer) showing a rotational frequency (rotational speed) of an internal-combustion engine provided in the host vehicle M.

The vehicle sensor 40 includes a vehicle speed sensor for detecting a speed of the host vehicle M, an acceleration sensor for detecting an acceleration, a yaw rate sensor for detecting an angular speed around a vertical shaft, an azimuth sensor for detecting a direction of the host vehicle M, and the like.

For example, the navigation device 50 includes a global navigation satellite system (GNSS) receiver 51, a navigation HMI 52, and a route determiner 53. In the navigation device 50, first map information 54 is retained in a storage device such as a hard disk drive (HDD) or a flash memory. The GNSS receiver 51 identifies the position of the host vehicle M on the basis of a signal received from a GNSS satellite. The position of the host vehicle M may be identified or complemented by an inertial navigation system (INS) utilizing an output of the vehicle sensor 40. The navigation HMI 52 includes a display device, a speaker, a touch panel, a key, and the like. A part or all of the navigation HMI 52 may be shared by the HMI 30 described above. For example, the route determiner 53 determines a route from the position of the host vehicle M identified by the GNSS receiver 51 (or an arbitrary input position) to a destination input by an occupant (hereinafter, a route on a map) using the navigation HMI 52 with reference to the first map information 54. For example, the first map information 54 is information in which road shapes are expressed by links indicating roads and nodes connected by the links. The first map information 54 may include curvatures of roads, point-of-interest (POI) information, and the like. The route on the map is output to the MPU 60. The navigation device 50 may perform route guide using the navigation HMI 52 on the basis of the route on the map. For example, the navigation device 50 may be realized by a function of a terminal device such as a smartphone or a tablet terminal possessed by an occupant. The navigation device 50 may transmit a current position and a destination to a navigation server via the communication device 20 and may acquire a route equivalent to the route on the map from the navigation server.

For example, the MPU 60 includes a recommendation lane determiner 61 and retains second map information 62 in a storage device such as an HDD or a flash memory. The recommendation lane determiner 61 divides the route on the map provided from the navigation device 50 into a plurality of blocks (for example, divides it into blocks of 100 [m] in a vehicle proceeding direction) and determines a recommendation lane for each block with reference to the second map information 62. The recommendation lane determiner 61 determines which lane from the left the vehicle should travel. When a branch point is present in the route on the map, the recommendation lane determiner 61 determines a recommendation lane such that the host vehicle M can travel along a reasonable route to proceed to a branch destination.

The second map information 62 is map information that is more accurate than the first map information 54. For example, the second map information 62 includes information of a central part of a lane, information of a boundary of a lane, and the like. The second map information 62 may include road information, traffic regulation information, address information (address and postal code), facility information, telephone number information, and the like. The second map information 62 may be updated at any time by the communication device 20 communicating with other devices. For example, the driver monitoring camera 70 is a digital camera utilizing a solid-state image capturing element such as a CCD or a CMOS. The driver monitoring camera 70 is attached to an arbitrary location in the host vehicle M in a position and a direction in which images of the head of an occupant seated in a driver's seat (hereinafter, a driver) of the host vehicle M can be captured from the front (in a direction in which images of the face are captured). For example, the driver monitoring camera 70 is attached to the upper part of the display device provided in the central part of the instrument panel of the host vehicle M. The driver monitoring camera 70 outputs images inside a cabin including the driver of the host vehicle M captured from the disposed position to the driving support device 100.

For example, in addition to a steering wheel 82, the driving operation piece 80 includes an operation switch of a direction indicator, an accelerator pedal, a brake pedal, a shift lever, and other operation pieces. A sensor for detecting an operation amount or the presence or absence of an operation is attached to the driving operation piece 80, and detection results thereof are output to some or all of the driving support device 100, the traveling driving force output device 200, the brake device 210, and the steering device 220. The steering wheel 82 does not always have an annular shape and may be in a form of a deformed steering wheel, a joystick, a button, or the like. A steering grip sensor 86 is attached to the steering wheel 82.

For example, the steering grip sensor 86 is realized by an electrostatic capacity sensor, a piezoelectric element, or the like. The steering grip sensor 86 detects whether or not the driver is in a state of gripping the steering wheel 82. Gripping denotes a state in which the driver is gripping the steering wheel, a state in which hands are in contact with the steering wheel and a force equal to or greater than a predetermined degree is applied to the steering wheel, or the like.

The steering grip sensor 86 may detect gripping on the basis of images captured by the camera or may detect gripping using an optical technique such as a radar device (a technique not requiring contact with the sensor).

For example, the driving support device 100 includes a recognizer 110, a driver recognizer 120, a congestion judger 130, a speed controller 140, a lane maintaining controller 150, a lane change controller 160, a planner 170, an information provider 180, and a storage 190. For example, some or all of these functions are realized by a hardware processor such as a central processing unit (CPU) executing a program (software). Some or all of these constituent elements may be realized by hardware (a circuit; including circuitry) such as a large scale integration (LSI), an application specific integrated circuit (ASIC), a field-programmable gate array (FPGA), or a graphics processing unit (GPU), or may be realized by software and hardware in cooperation. A program may be stored in a storage device such as an HDD or a flash memory (a storage device including a non-transitory storage medium) of the driving support device 100 in advance or may be stored in an attachable/detachable storage medium such as a DVD or a CD-ROM such that the program is installed in the HDD or the flash memory of the driving support device 100 when the storage medium (non-transitory storage medium) is mounted in a drive device. A functional constituent including at least the congestion judger 130 and the lane change controller 160 is an example of "a controller".

For example, the storage 190 is realized by an HDD, a flash memory, an electrically erasable programmable read only memory (EEPROM), a read only memory (ROM), a random access memory (RAM), or the like. For example, vehicle information 192 is stored in the storage 190 (details will be described below).

The recognizer 110 recognizes a state of an object around the host vehicle M, such as a position, a speed, and an acceleration, on the basis of information input from the camera 10, the radar device 12, and the LIDAR 14 via the object recognition device 16. For example, the position of an object is recognized as a position on absolute coordinates with an origin at a representative point (a centroid, a drive shaft center, or the like) in the host vehicle M and is used for control. The position of an object may be indicated by a representative point such as a centroid or a corner of the object or may be indicated as a region. A "state" of an object may include an acceleration or a jerk of an object or "an action state" (for example, whether or not it is making a lane change or it is attempting a lane change).

For example, the recognizer 110 recognizes a lane in which the host vehicle M is traveling (traveling lane). For example, the recognizer 110 recognizes the traveling lane by comparing patterns (for example, arrays of solid lines and dotted lines) of road division lines obtained from the second map information 62 and patterns of road division lines around the host vehicle M recognized from images captured by the camera 10. The recognizer 110 may recognize the traveling lane by recognizing traveling path boundaries (road boundaries) including road division lines, road shoulders, curbstones, median strips, guardrails, and the like without being limited to road division lines. In this recognition, a position of the host vehicle M acquired from the navigation device 50 or processing results of the INS may be added. The recognizer 110 recognizes stop lines, obstacles, red lights, toll gates, and other road events.

When recognizing the traveling lane, the recognizer 110 recognizes a position or a posture of the host vehicle M with respect to the traveling lane. For example, the recognizer 110 may recognize a deviation of a reference point in the host vehicle M from the center of the lane and an angle formed with respect to a line of the centers of the lane of the host vehicle M in a proceeding direction as a relative position and a posture of the host vehicle M with respect to the traveling lane. Instead, the recognizer 110 may recognize a position or the like of a reference point in the host vehicle M with respect to any side end part (a road division line or a road boundary) of the traveling lane as a relative position of the host vehicle M with respect to the traveling lane.

The driver recognizer 120 detects whether or not the driver is in a predetermined state on the basis of images captured by the driver monitoring camera 70. A predetermined state denotes a state in which hands-off lane maintaining control (which will be described below) can be executed. A hands-off state denotes a state in which the driver is not gripping the steering wheel, and a hands-on state denotes a state in which the driver is gripping the steering wheel. A state in which the hands-off lane maintaining control can be executed denotes a state in which the driver is monitoring the front (or around the host vehicle M). For example, monitoring the front denotes a state in which the driver is monitoring the front such that the driver can quickly take over from control of the host vehicle M by the vehicle system 1 to an operation of the host vehicle M by the driver. For example, monitoring the front denotes a state in which the gaze of the driver is directed to the front.

The congestion judger 130 judges whether or not a search range (which will be described below) is congested, and when it is judged that the search range is congested, branch exit support for making a lane change from the traveling lane to a branch lane is suspended. Details of this processing will be described below.

The speed controller 140 automatically controls the speed of the host vehicle M by automatically controlling the traveling driving force output device 200 and the brake device 210 without depending on an operation of the driver. The speed controller 140 executes so-called adaptive cruise control (ACC).

For example, when no different vehicle is present in front of the host vehicle M within a predetermined distance from the host vehicle M, the speed controller 140 automatically controls the traveling driving force output device 200 and the brake device 210 without depending on an operation of the driver such that the host vehicle M travels at a speed set by the driver or at a speed set in advance correspondingly to a legal speed limit or a road.

For example, when a different vehicle is present in front of the host vehicle M within a predetermined distance from the host vehicle M, the speed controller 140 automatically controls the traveling driving force output device 200 and the brake device 210 without depending on an operation of the driver such that the host vehicle M follows the different vehicle. Following denotes that the host vehicle M travels behind a different vehicle while maintaining a position at a predetermined distance from the different vehicle. When branch exit support is executed, the speed controller 140 controls the speed of the host vehicle M such that a lane change to a branch lane can be smoothly made.

The lane maintaining controller 150 controls the steering device 220 such that the host vehicle M does not depart from the traveling lane. For example, the lane maintaining controller 150 controls the steering device 220 such that the host vehicle M travels at the center or in the vicinity of the center of the traveling lane recognized by the recognizer 110. Hereinafter, this control may be referred to as "lane maintaining control". The lane maintaining controller 150 executes the hands-on lane maintaining control and the hands-off lane maintaining control.

The hands-on lane maintaining control is control executed in a state in which the driver is gripping the steering wheel (a state in which the steering grip sensor 86 has detected the steering wheel being gripped). Conditions for allowing execution of the hands-on lane maintaining control are less strict than conditions for allowing execution of the hands-off lane maintaining control. For example, the hands-on lane maintaining control is executed under the condition that the speed of the host vehicle M is equal to or higher than a predetermined speed and the driver is monitoring the front.

The hands-off lane maintaining control is control executed in a state in which the driver is not gripping the steering wheel (a state in which the steering grip sensor 86 has not detected the steering wheel being gripped). For example, the hands-off lane maintaining control can be executed when the following conditions are satisfied. That is, the speed of the host vehicle M is equal to or higher than a predetermined speed, the host vehicle M is traveling on a predetermined road (for example, a road or the kind of a road set in advance such that the hands-off lane maintaining control can be executed), and the driver is monitoring the front. The hands-off lane maintaining control is executed when the driver is monitoring the front, and the hands-off lane maintaining control is not executed or is stopped when the driver is not monitoring the front.

The conditions for allowing execution of the hands-on lane maintaining control and the hands-off lane maintaining control described above are an example, other conditions (for example, the host vehicle M is following a preceding vehicle) may be included or some conditions may be omitted. The conditions for allowing execution of the hands-on lane maintaining control need only be less strict than the conditions for allowing execution of the hands-off lane maintaining (the conditions for allowing execution of the hands-off lane maintaining control need only be stricter than the conditions for allowing execution of the hands-on lane maintaining).

The lane change controller 160 causes the host vehicle M to automatically make a lane change. For example, the lane change controller 160 generates a trajectory for a lane change and causes the host vehicle M to make a lane change such that the host vehicle M travels along the generated trajectory. The lane change controller 160 causes the host vehicle M to make a lane change (ALC; auto lane change) on the basis of a destination set by an occupant, a route generated by the planner 170, and a recommendation lane output by the MPU 60. For example, the lane change controller 160 performs a lane change when a lane change is necessary to be headed for a destination. For example, when the driver has set in advance to utilize auto lane change (when auto lane change is in use), an auto lane change to be headed for a destination is executed.

When a lane change is instructed by the driver, the lane change controller 160 may cause the host vehicle M to automatically make a lane change. Instruction of a lane change is an operation of a lever of the operation switch of the direction indicator. For example, if the driver operates the lever in a direction in which the driver desires to cause the host vehicle M to make a lane change, the host vehicle M makes a lane change in the direction corresponding to the operation. Instruction of a lane change may be an operation different from an operation of the lever of the operation switch of the direction indicator. For example, a lane change may be made when a predetermined operation button is pressed.

For example, when the following conditions are satisfied, the lane change controller 160 executes a lane change. Examples of the conditions include that no obstacle is present in a lane change destination lane, the host vehicle M does not interfere with surrounding different vehicles when making a lane change, the host vehicle M is not in a section where a lane change is prohibited (there is no road marking or sign prohibiting a lane change), a lane change destination lane has been recognized (it actually exists), a yaw rate detected by the vehicle sensor 40 is lower than a threshold, and the radius of curvature of the traveling road is equal to or larger than a predetermined value. The conditions for executing a lane change may include other conditions, and some conditions may be omitted.

For example, the lane change controller 160 may execute a lane change on condition that the driver is gripping the steering wheel (the steering grip sensor 86 has detected the steering wheel being gripped).

The planner 170 generates a plan for traveling of the host vehicle M on the basis of the route along which the host vehicle M is headed for the destination set by an occupant. Essentially, the planner 170 generates a target trajectory in which the host vehicle M automatically (without depending on an operation of the driver) travels in the future such that the host vehicle M can travel in a recommendation lane determined by the recommendation lane determiner 61 and can also cope with the surrounding situation of the host vehicle M. For example, a target trajectory may include a speed element. For example, a target trajectory is expressed as a sequence of points (trajectory points) which the host vehicle M should reach. A trajectory point is a point which the host vehicle M should reach every predetermined traveling distance (for example, approximately several [m]) that is a distance along the road. Separately, a target speed and a target acceleration are generated every predetermined sampling time (for example, on the order of approximately several tenths of [sec]) as a part of the target trajectory. A trajectory point may be a position which the host vehicle M should reach at a sampling time of every predetermined sampling time. In this case, information of the target speed and the target acceleration is expressed at intervals of the trajectory points.

For example, the planner 170 causes the host vehicle M to travel in the target trajectory in association with the speed controller 140, the lane maintaining controller 150, and the lane change controller 160. This control may be referred to as "driving support control".

For example, in a state in which the driver of the host vehicle M is monitoring surrounding areas of the host vehicle M, the planner 170 generates an action plan for the host vehicle M such that the host vehicle M reaches a destination due to the speed controller 140 controlling the speed of the host vehicle M, the lane maintaining controller 150 controlling steering, and as necessary, the driver controlling the speed, gripping the steering wheel, or operating the steering wheel. For example, the planner 170 generates a plan in which the host vehicle M is caused to travel by an operation of the driver in a first section and the host vehicle M is caused to travel by control of the driving support device 100 in a second section and causes the host vehicle M to travel in association with the driver, the congestion judger 130, the speed controller 140, the lane maintaining controller 150, and the lane change controller 160 in accordance with the plan.

Figure 2:
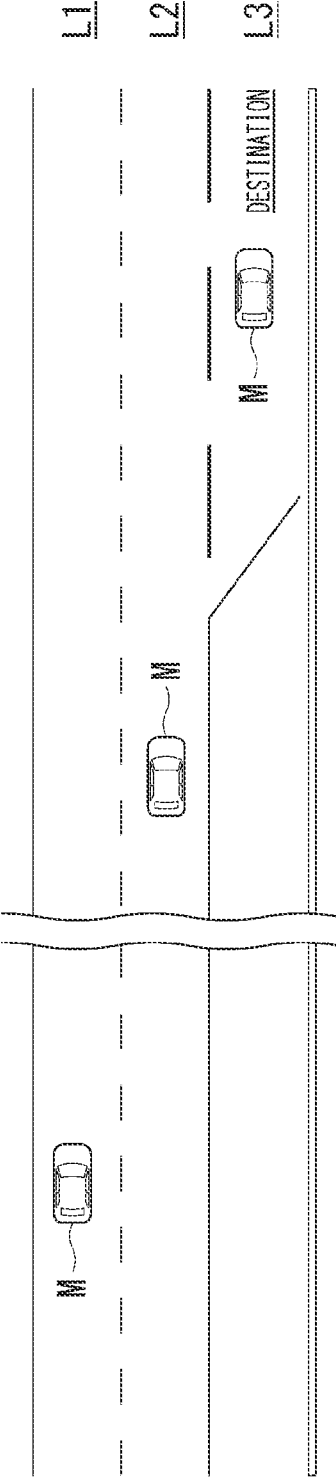
FIG. 2 is a view showing an example of driving support control.

FIG. 2 is a view showing an example of driving support control. It is assumed that the host vehicle M plans to travel in a first lane L1, make a lane change to a second lane L2, and then make a lane change to a branch lane L3 to be headed for a destination. In this case, the speed controller 140 controls the speed and the lane maintaining controller 150 and the lane change controller 160 causes the host vehicle M to make a lane change or to travel in the traveling lane and the branch lane such that the host vehicle M is headed for the destination. Accordingly, the host vehicle M is headed for the destination without depending on an operation of the driver.

The information provider 180 causes the HMI 30 to output the state of the host vehicle M or various information related to driving support in a form of audio or images.

The traveling driving force output device 200 outputs a traveling driving force (torque) for causing the host vehicle M to travel to driving wheels. For example, the traveling driving force output device 200 includes a combination of an internal-combustion engine, an electric motor, a transmission, and the like, and an ECU controlling these. The ECU controls the foregoing constituents in accordance with information input from the speed controller 140 or information input from the driving operation piece 80.

For example, the brake device 210 includes a brake caliper, a cylinder transmitting a hydraulic pressure to the brake caliper, an electric motor generating a hydraulic pressure in the cylinder, and a brake ECU. The brake ECU controls the electric motor in accordance with information input from the speed controller 140 or information input from the driving operation piece 80 such that a brake torque corresponding to a braking operation is output to each of the wheels.

For example, the steering device 220 includes a steering ECU and an electric motor. For example, the electric motor causes a force to act on a rack-and-pinion mechanism to change the direction of steered wheels. The steering ECU drives the electric motor to change the direction of the steered wheels in accordance with information input from the lane maintaining controller 150 or the lane change controller 160 or information input from the driving operation piece 80.

[Congestion Judgment Processing and Driving Support Control]

When the host vehicle M is scheduled to proceed from a traveling lane in which the host vehicle M is traveling to a branch lane branching from the traveling lane, the driving support device 100 determines whether or not to cause the host vehicle M to make a lane change from the traveling lane to the branch lane on the basis of the situation on the road shoulder in front of the branch lane. When it is determined to make a lane change, the driving support device 100 causes the vehicle to automatically make a lane change. A lane change at this time is control of causing the host vehicle M to make a lane change to the branch lane.

When it is determined not to make a lane change, the driving support device 100 causes the host vehicle M not to automatically make a lane change. For example, when it is determined not to make a lane change, the driving support device 100 causes the HMI 30 (information output device) to output information notifying the driver of the host vehicle M of an operation of steering to be performed without causing the host vehicle M to automatically make a lane change. Accordingly, the driver can manually perform a lane change by controlling steering.

The foregoing state of the road shoulder in front of the branch lane denotes a congestion situation on the road shoulder. For example, the driving support device 100 causes the host vehicle M to automatically make a lane change when the road shoulder in front of the branch lane is not congested and causes the host vehicle M not to automatically make a lane change when the road shoulder in front of the branch lane is congested.

As described above, since the driving support device 100 suspends control of causing the host vehicle M to automatically make a lane change to a branch lane (branch exit support) in front of the branch lane, the driver can make a lane change of the host vehicle M to the branch lane by performing a driving operation with plenty of time.

When a lane change to a branch lane is suspended, speed control by the driving support device 100 may also be suspended, and a notification requesting that the driver controls the speed may be issued to the driver.

Figure 3:
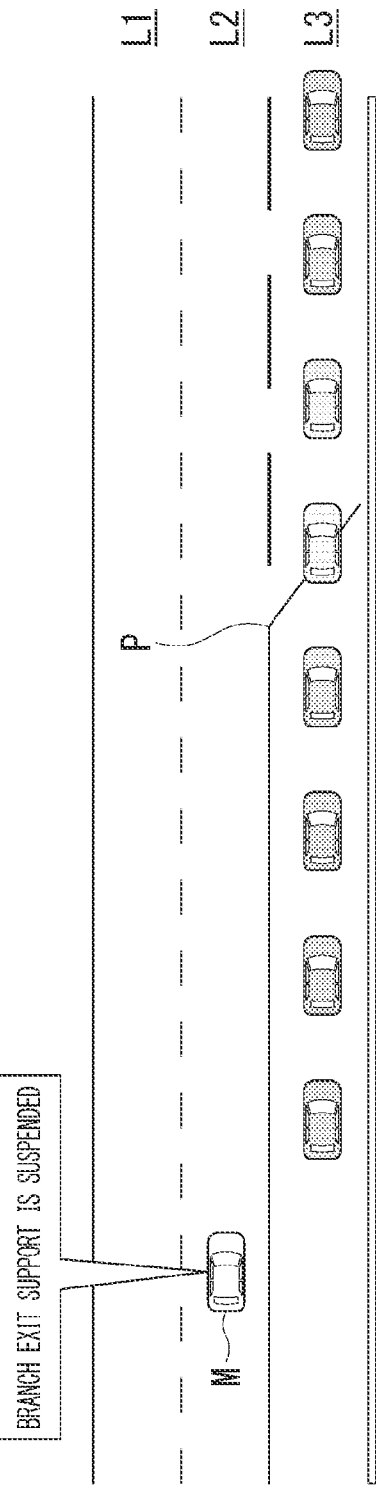
FIG. 3 is an explanatory view of congestion judgment processing and driving support control.

FIG. 3 is an explanatory view of congestion judgment processing and driving support control. Description will focus on points different from FIG. 2. The host vehicle M is traveling in a second traveling lane L2. When congestion has occurred on the road shoulder in front of a branch exit point P (branch lane), the driving support device 100 suspends branch exit support. For example, the branch exit point P is a point set in advance, such as a starting point of a branch lane.

Figure 4:
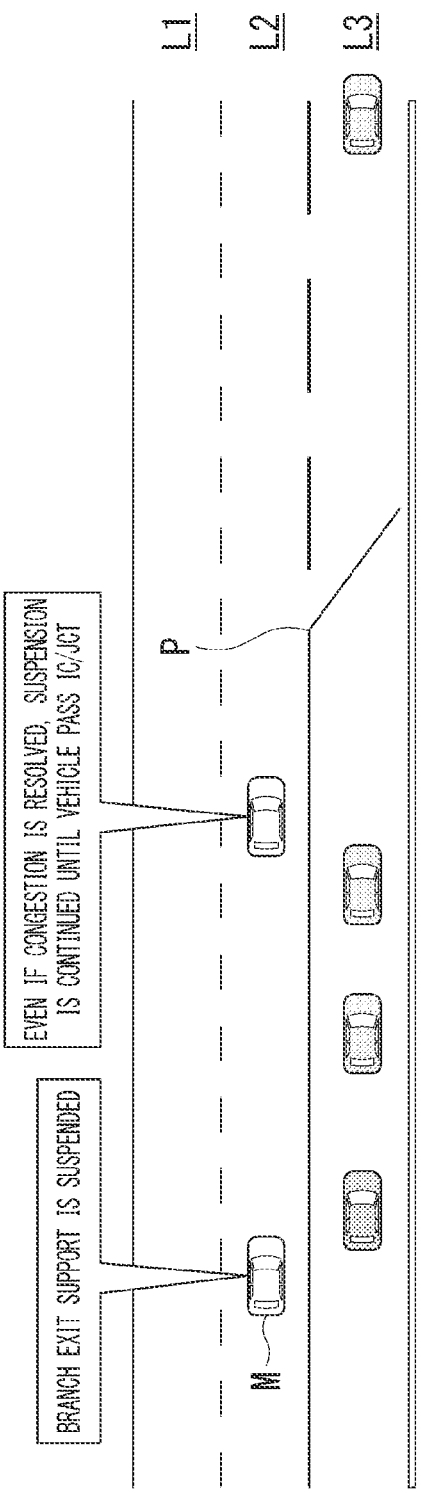
FIG. 4 is an explanatory view of control after branch exit support has been suspended.

FIG. 4 is an explanatory view of control after branch exit support has been suspended. The driving support device 100 continues to cause the host vehicle M not to automatically make a lane change until the host vehicle M passes a predetermined position in the branch lane even when it is judged that congestion has not occurred after it is determined to cause the host vehicle M not to automatically make a lane change and the lane change is suspended (after branch exit support is suspended). As shown in FIG. 4, suspension of branch exit support continues even when congestion in the branch lane in front of the host vehicle M is eased and congestion has not occurred on the road shoulder in front of the host vehicle M after branch exit support is suspended. For example, a predetermined position in the branch lane is an interchange, a junction, or the like connected to the branch lane, for example. A predetermined position may be a predetermined position in the traveling lane or the branch lane.

As described above, since the driving support device 100 suspends branch exit support in front of the branch lane and continues the suspension, restarting or suspending of branch exit support due to the situation of congestion can be curbed. Accordingly, the driving support device 100 can curb confusion of the driver.

[Flowchart]

Figure 5:
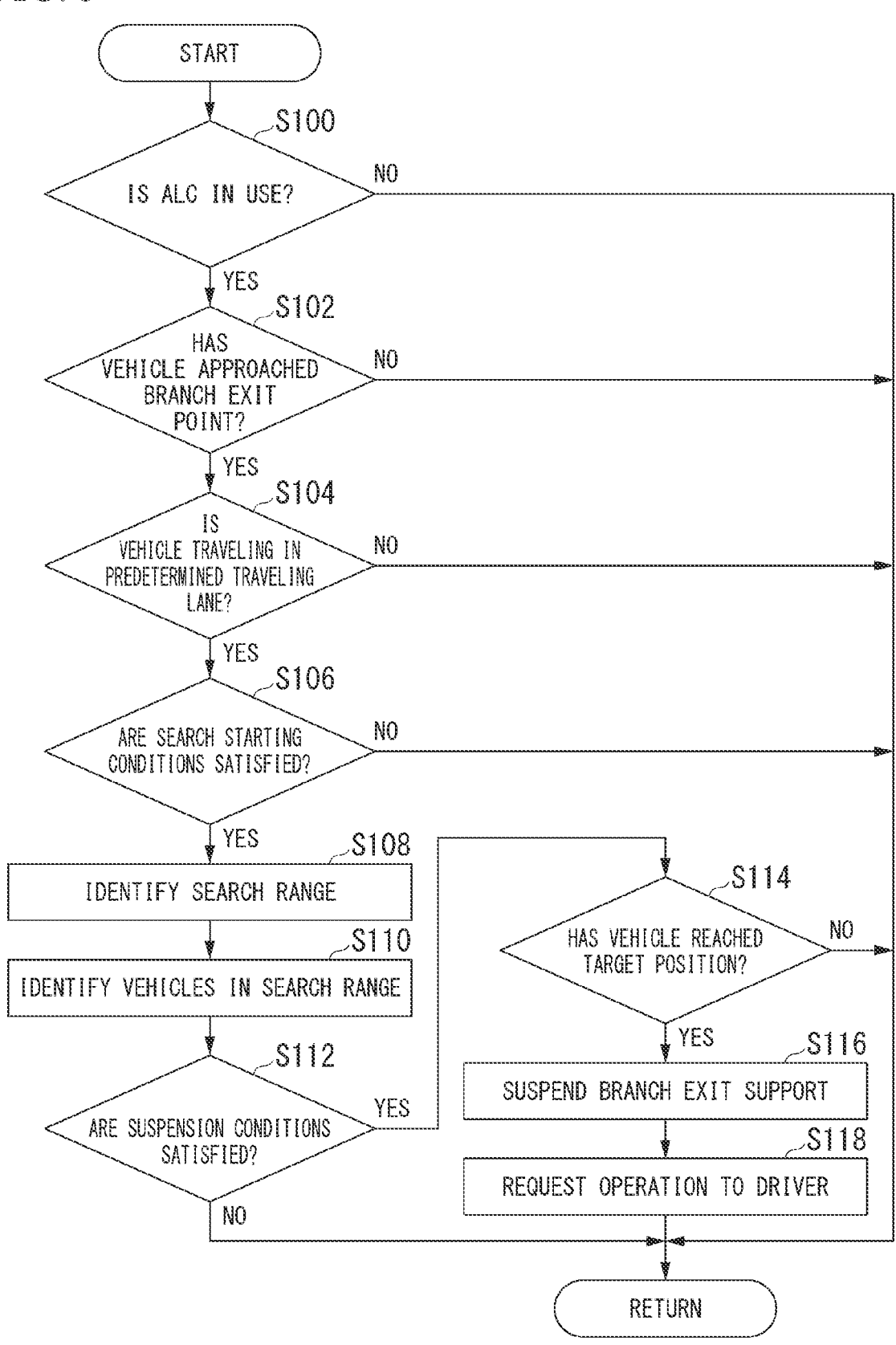
FIG. 5 is a flowchart showing an example of a flow of processing executed by a driving support device.

FIG. 5 is a flowchart showing an example of a flow of processing executed by the driving support device 100. The order of the processing of this flowchart may be switched, and a part of the processing may be omitted. Details of each step of the processing or details of each of the conditions will be described below.

First, the driving support device 100 judges whether or not auto lane change is in use (Step S100). When auto lane change is in use, the driving support device 100 judges whether or not the host vehicle M has approached a branch exit point (Step S102). When the host vehicle M has approached a branch exit point, the driving support device 100 judges whether or not the host vehicle M is traveling in a predetermined traveling lane (Step S104). For example, a predetermined traveling lane denotes a lane adjacent to a road shoulder in front in an extending direction of the branch lane or a lane adjacent to a branch lane. In FIGS. 3 and 4, a predetermined traveling lane is the traveling lane L2.

When the host vehicle M is traveling in a predetermined traveling lane, the driving support device 100 judges whether or not search starting conditions are satisfied (Step S106). When the search starting conditions are satisfied, the driving support device 100 identifies a search range (Step S108) and identifies vehicles in the search range (Step S110).

Next, the driving support device 100 judges whether or not suspension conditions are satisfied (Step S112). When the suspension conditions are satisfied, the driving support device 100 judges whether or not the host vehicle M has reached a target position (Step S114). When it has reached a target position, the driving support device 100 suspends branch exit support (Step S116) and notifies the driver of a request for an operation (Step S118).

A target position may be a position where the driving support device 100 judges that congestion has occurred and the host vehicle M has reached a location within a predetermined distance from the tail end of the congestion, or may be a position where it is judged that congestion has occurred and the host vehicle M has reached the tail end of the congestion. A tail end of congestion denotes a different vehicle at the tail end of congestion. A different vehicle at the tail end is a vehicle having no different vehicle present behind the target different vehicle within a predetermined distance or longer. As described above, since the driving support device 100 suspends branch exit support based on the tail end or issues a notification, it is easy for the driver to be able to understand that branch exit support has been suspended due to congestion.

In this way, processing of one routine in this flowchart ends. When the judgment in Steps S100, S102 to S106, and S112 described above is negative, processing of one routine in this flowchart ends.

[Search Starting Conditions]

Figure 6:
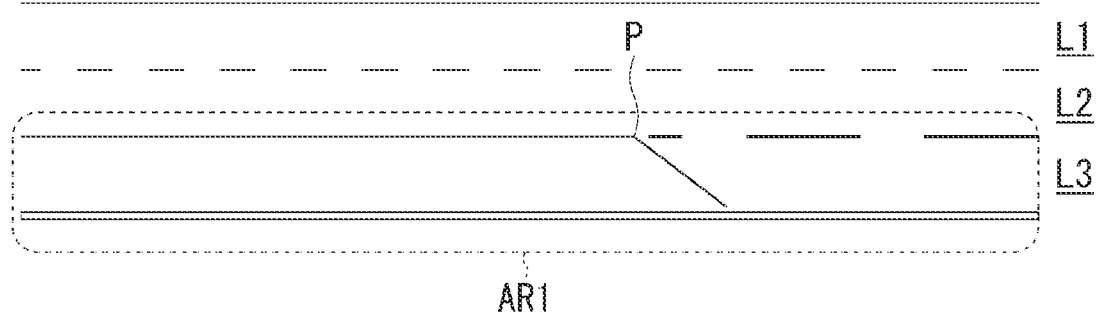
FIG. 6 is an explanatory view of search starting conditions.

The search starting conditions are that there is a region in which an adjacent lane is not present or a region in which a branch lane is present in front of the host vehicle M within a predetermined distance. FIG. 6 is an explanatory view of search starting conditions. In order to perform judgment of congestion with respect to vehicles on a road shoulder and a branch lane, when there is a region in which an adjacent lane is not present or a region in which a branch lane is present with respect to a traveling lane in front of the host vehicle M within a predetermined distance as shown in a region AR1 in FIG. 6, the driving support device 100 judges that the search starting conditions are satisfied. For example, a region in which an adjacent lane is not present denotes a region in which a road shoulder is present. The driving support device 100 performs mentioned above judgment with reference to the lane in which the host vehicle M is traveling, the position of the host vehicle M in the lane, and map information (the first map information 54 or the second map information 62).

[Identification of Search Range]

Figure 7:
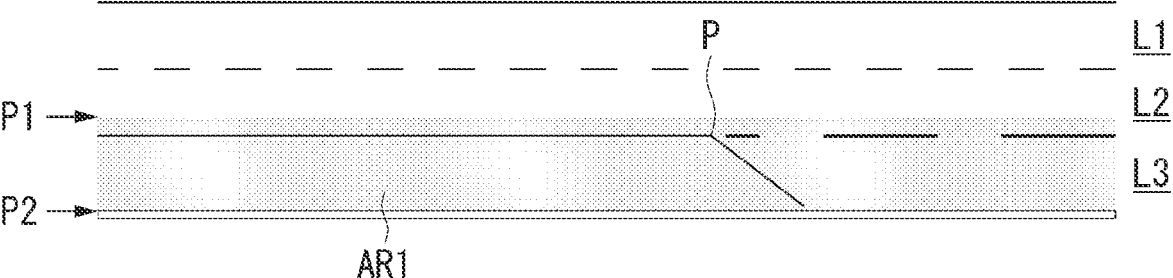
FIG. 7 is an explanatory view of a search range.

For example, a search range includes a road shoulder and a branch lane satisfying the search starting conditions. FIG. 7 is an explanatory view of a search range. The range of the search range AR1 in the width direction of the lane is a range demarcated by a first position P1 and a second position P2. The first position P1 on the road shoulder is a position at a predetermined distance on a second division line side on the traveling lane L1 side from a first division line on the road shoulder side of the traveling lane L2. Accordingly, a different vehicle present on the first division line can also become a judgment target in the processing which will be described below. The second position P2 on the road shoulder is a position at a predetermined distance on the road shoulder side in the width direction from the first division line. When the map information includes information indicating the boundary of the road, the second position P2 on the road shoulder is a position closer to the traveling lane L2 between the position in the boundary line of the road and the position at the foregoing predetermined distance.

The first position P1 and the second position P2 in the branch lane are similar to the first position P1 and the second position P2 on the road shoulder. The first position P1 in the branch lane is a position at a predetermined distance on the second division line side on the traveling lane L1 side from the first division line on the branch lane side of the traveling lane L2. Accordingly, a different vehicle present on the first division line can also become a judgment target in the processing which will be described below. The second position P2 in the branch lane is a position at a predetermined distance on the branch lane side in the width direction from the first division line. When the map information includes information indicating the boundary of the road, the second position P2 in the branch lane is a position closer to the traveling lane L2 between the position in the boundary line of the road and the position at the foregoing predetermined distance. In the example of FIG. 7, since the road shoulder and the branch lane have the same width, the first position P1 and the second position P2 are set at the same position, and a region demarcated by these positions is the search range AR1.

For example, the region of the search range in the proceeding direction includes a region from the branch exit point P to a location in front at a first predetermined distance. The congestion judger 130 recognizes the situation in the region in front of the host vehicle M and in front at the first predetermined distance on the basis of recognition results of the recognizer 110 (acquires information on the presence or absence of vehicles). The first predetermined distance is set to a distance which varies depending on the speed of the host vehicle M. For example, the congestion judger 130 sets the first predetermined distance to be longer as the speed of the host vehicle M becomes higher and sets the first predetermined distance to be shorter as the speed of the host vehicle M becomes lower. For example, even when the speed of the host vehicle M is high, congestion can be accurately judged before the host vehicle M arrives at the tail end of the congestion, and when the speed of the host vehicle M is low, congestion can be accurately judged before the host vehicle M arrives at the tail end of the congestion while the processing load is reduced. The search range in front of the branch exit point P is a range in front at a predetermined distance from the branch exit point P.

[Identification of Vehicle (1)]

Figure 8:
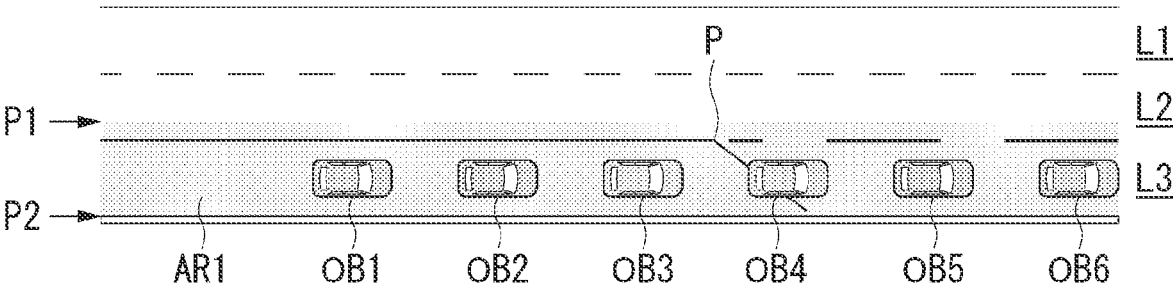
FIG. 8 is an explanatory view of processing of identifying vehicles in the search range.

The driving support device 100 identifies vehicles in the search range. FIG. 8 is an explanatory view of processing of identifying vehicles in the search range. As shown in FIG. 8, the driving support device 100 recognizes different vehicles OB1 to OB6 in the search range AR1 on the basis of recognition results of the recognizer 110.

[Identification of Vehicle (2)]

The recognizer 110 recognizes objects at predetermined intervals. For example, the driving support device 100 generates the vehicle information 192 for each of the results recognized by the recognizer 110 at predetermined intervals (or at arbitrary predetermined intervals). The driving support device 100 newly registers vehicles satisfying the conditions in the vehicle information 192. FIG. 9 is an explanatory view of registration target vehicles. For example, the driving support device 100 newly registers vehicles satisfying all the conditions (1) to (5) in the vehicle information 192.

(1) An object not registered in the vehicle information 192.

(2) An object within the search range.

(3) An object whose attribute is a vehicle.

(4) A degree of reliability in recognition of an object equal to or higher than the threshold.

(5) An object whose speed is equal to or lower than the threshold.

A degree of reliability in recognition of an object denotes that the score of the degree of reliability derived by the recognizer 110 on the basis of a predetermined algorithm, model, or the like set in advance is equal to or higher than the threshold. An object satisfying the conditions (1) to (5) is registered in the vehicle information 192.

FIG. 10 is a view showing an example of details of the vehicle information 192. The vehicle information 192 includes information on objects newly registered at each time and objects which have been registered in the past. As shown in FIG. 10, for example, the vehicle information 192 includes the objects OB1 to OB6 at each time and information indicating whether or not the conditions (1) to (5) are satisfied. The driving support device 100 deletes an object which has not been continuously recognized for a predetermined time or longer from the vehicle information 192 with reference to the vehicle information 192 at each time. This is because, in this case, there is a probability that an object is present behind the host vehicle M due to the host vehicle M which has proceeded. In addition, the driving support device 100 deletes an object which no longer satisfies the conditions (or an object which no longer satisfies the conditions for a predetermined time) from the vehicle information 192. When the host vehicle M has made a lane change, the driving support device 100 resets the vehicle information 192. This is because, in this case, there is a high probability that the position of an object with respect to the host vehicle M has changed significantly.

[Suspension Conditions]

The driving support device 100 suspends branch exit support with reference to the foregoing vehicle information 192 when a predetermined number or more of vehicles are present on the road shoulder in front of the host vehicle M (for example, when three or more vehicles are present). For example, when the foregoing conditions are satisfied, the congestion judger 130 sets a curbing flag. The lane change controller 160 curbs branch exit support for performing a lane change to a branch lane on the basis of the set curbing flag. In place of (or in addition to) the above, the suspension conditions may be that branch exit support is suspended when vehicles are queuing up on the road shoulder in front of the host vehicle M and this queue is equal to or longer than a predetermined distance. That is, when a plurality of vehicles are present in a queue in the search range and the length of a convoy present in a queue is equal to or longer than a second setting distance (for example, a predetermined length such as 20 m or longer), the congestion judger 130 judges that congestion has occurred and suspends branch exit support. The driving support device 100 may not judge that the vehicles are not target vehicles in congestion or may not judge that the vehicles are queuing up when the intervals between the vehicles are equal to or larger than the threshold.

For example, the driving support device 100 satisfies the foregoing suspension conditions before branch exit support is suspended. However, when the conditions are no longer satisfied thereafter, branch exit support is continued. Regarding this, the driving support device 100 continues to cause the host vehicle M not to automatically make a lane change even when it is judged that congestion has not occurred after it is determined to cause the host vehicle M not to automatically make a lane change (after the suspension conditions are satisfied and branch exit support is suspended or, after the driver is proposed to suspend it or make a lane change by driving of the driver). For example, the driving support device 100 continues suspension of branch exit support up to a predetermined position even after branch exit support is suspended and the suspension conditions are no longer satisfied thereafter.

[Overall Summary]

Figure 11:
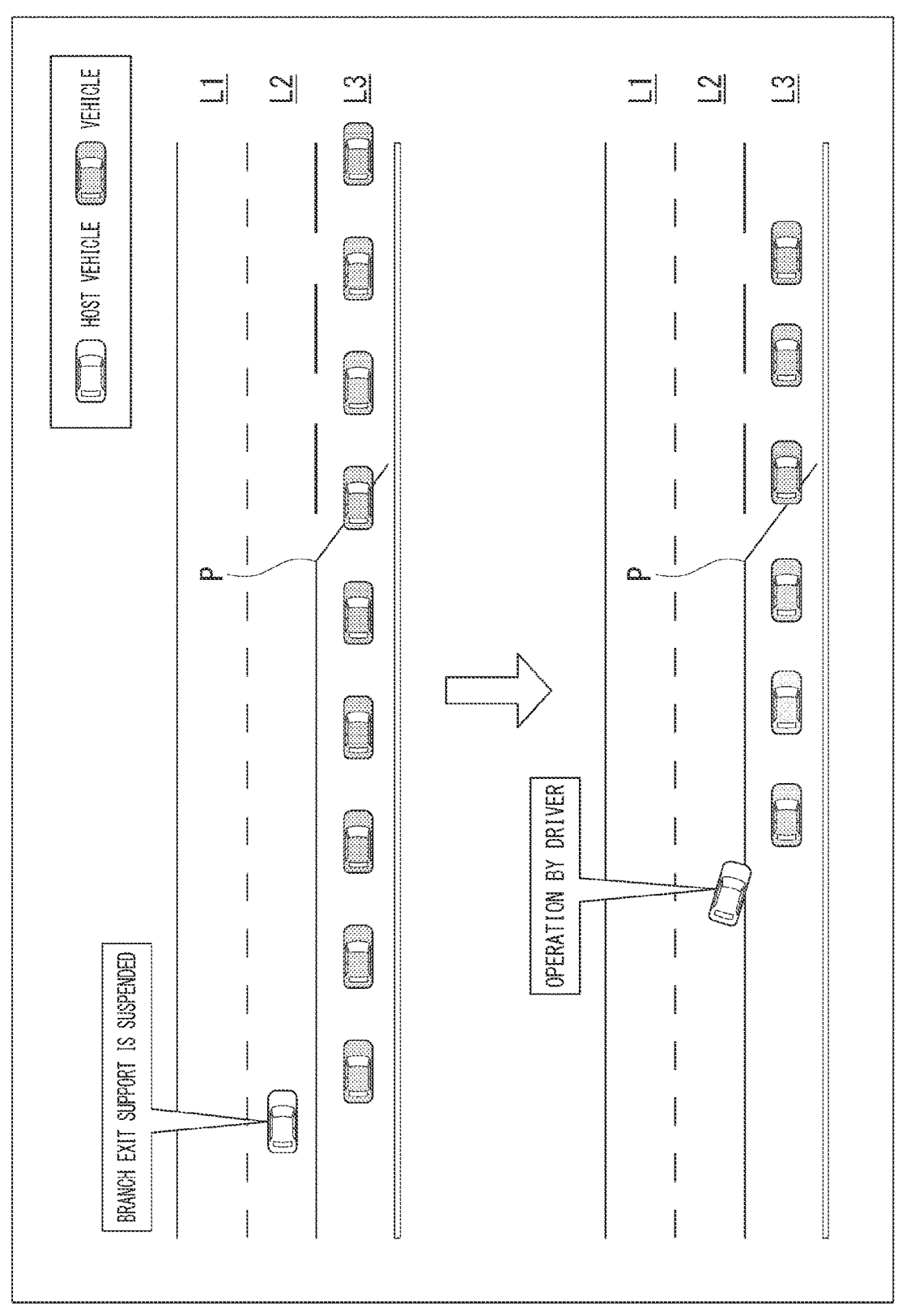
FIG. 11 is a view showing an example of a scene in which branch exit support has been suspended.

FIG. 11 is a view showing an example of a scene in which branch exit support has been suspended. As shown in the upper diagram of FIG. 11, when the host vehicle M reaches the tail end of vehicles present on the road shoulder (or when it reaches a target position), the host vehicle M suspends branch exit support. Thereafter, the driver controls steering and the speed. As shown in the lower diagram of FIG. 11, since the different vehicle slowly proceeds toward the branch lane after branch exit support is suspended, the tail end becomes the vehicle in front of the host vehicle M so that the driver can cause the host vehicle M to proceed behind the tail end with plenty of time by controlling steering and the speed.

As described above, the driving support device 100 can realize control of the host vehicle M suited to the situation of congestion by appropriately suspending branch exit support in accordance with the situation of congestion.

In the foregoing processing, it has been described that congestion on the road shoulder is judged. However, in place of (or in addition to) this, when the road shoulder is congested but the branch lane is congested and there is no space in the branch lane L3 for the vehicle to enter the branch lane L3 from the traveling lane L2, the driving support device 100 may suspend branch exit support at a target position. For example, a target position denotes a position where the host vehicle M has reached the vehicle at the tail end of congestion in the branch lane L3, a position in the vicinity of the vehicle at the tail end, a position in front at a predetermined distance from the vehicle at the tail end, the branch exit point P, or a position in front at a predetermined distance from the branch exit point P.

In the foregoing processing, it has been described that congestion on the road shoulder is judged. However, in place of (or in addition to) this, when congestion straddling the road shoulder and the branch lane has occurred, the driving support device 100 may suspend branch exit support at a predetermined position. For example, when at least one vehicle is present on the road shoulder and a predetermined number of (for example, two) vehicles are present within a predetermined distance in front thereof in the branch lane L3, the driving support device 100 may suspend branch exit support at a target position.

[Processing when Congestion is Resolved]

Figure 12:
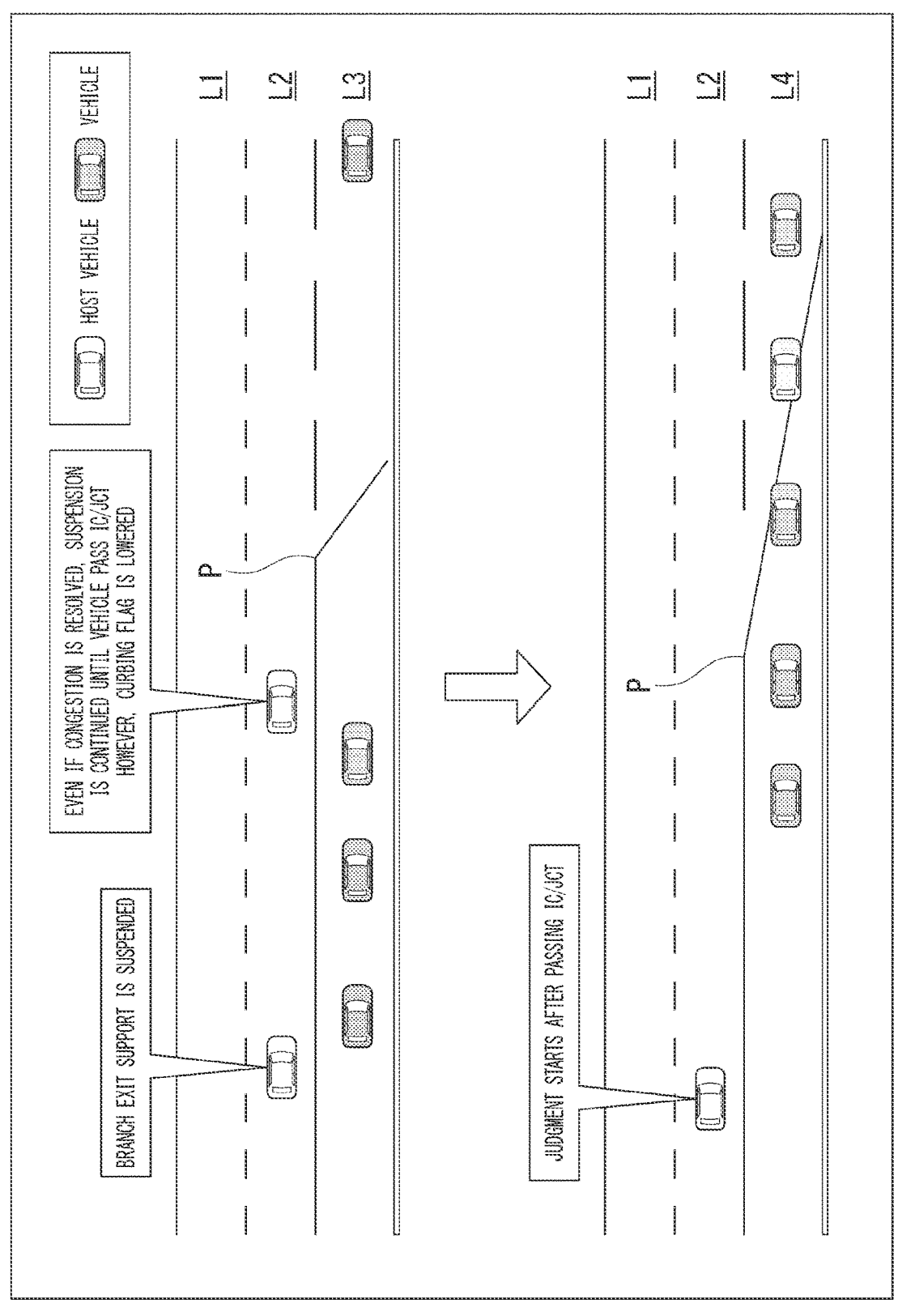
FIG. 12 is an explanatory view of processing when congestion is resolved.

When congestion resolved, the driving support device 100 cancels the setting of the curbing flag described above such that judgment of congestion can be smoothly performed. FIG. 12 is an explanatory view of processing when congestion is resolved. As shown in the upper diagram of FIG. 12, after branch exit support is suspended, the driving support device 100 cancels (lowers) the setting of the curbing flag when congestion is not present in front of the host vehicle M. The driving support device 100 suspends branch exit support up to a predetermined position (an interchange, a junction, or a position set with respect to the traveling lane).

Thereafter, if the host vehicle M passes the predetermined position, the driving support device 100 restarts judgment of congestion. The driving support device 100 restarts judgment of congestion when the conditions that the host vehicle M passes the predetermined position and the curbing flag is canceled are satisfied. As shown in the lower diagram of FIG. 12, the driving support device 100 can perform judgment of congestion even when a next branch lane L4 is present after passing the branch lane L3 (continuously traveling in the traveling lane L2) or traveling in the branch lane L3.

As described above, since the driving support device 100 suspends branch exit support at an appropriate timing (target position) and restarts judgment of congestion at an appropriate timing, judgment of congestion and suspension of branch exit support can be appropriately performed.

[Processing when Congestion is Present Behind when Host Vehicle has Made Lane Change]

Figure 13:
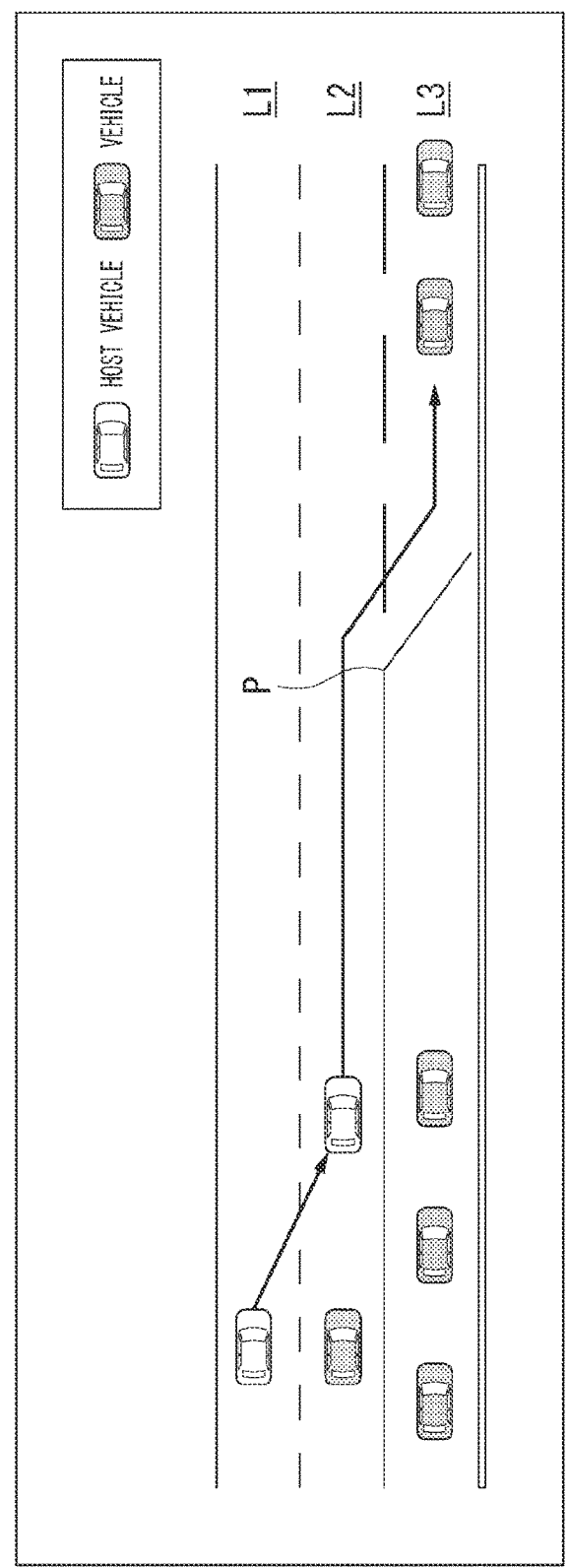
FIG. 13 is a view showing an example of a scene in which branch exit support is continued.

The driving support device 100 may continue branch exit support when the search range in front of the host vehicle M is not crowded after the host vehicle M is caused to make a lane change. FIG. 13 is a view showing an example of a scene in which branch exit support is continued. While the host vehicle M travels in the traveling lane L1 and makes a lane change to the traveling lane L2, when the search range behind the host vehicle M is crowded and the search range in front of the host vehicle M is not crowded, the host vehicle M makes a lane change to the branch lane L3 by branch exit support.

As described above, since the driving support device 100 executes branch exit support suited to the situation of the search range after a lane change is made, favorable vehicle control for a driver can be realized.

[Processing with Respect to Branch Lane]

Figure 14:
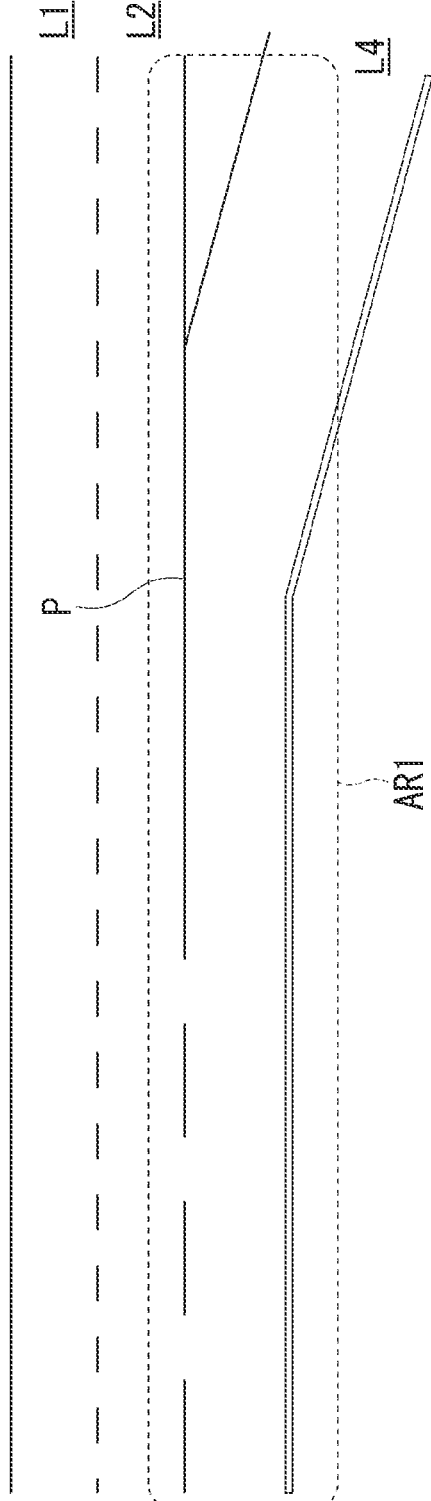
FIG. 14 is a view showing an example of the search range set in a branch lane.

Processing in which the driving support device 100 sets a search range in a branch lane will be described. FIG. 14 is a view showing an example of the search range set in a branch lane. As shown in FIG. 14, when there is a region in which a branch lane is present in front of the host vehicle M within a predetermined distance, the driving support device 100 may judge that the search starting conditions are satisfied and may set the search range AR1 in the branch lane.

Figure 15:
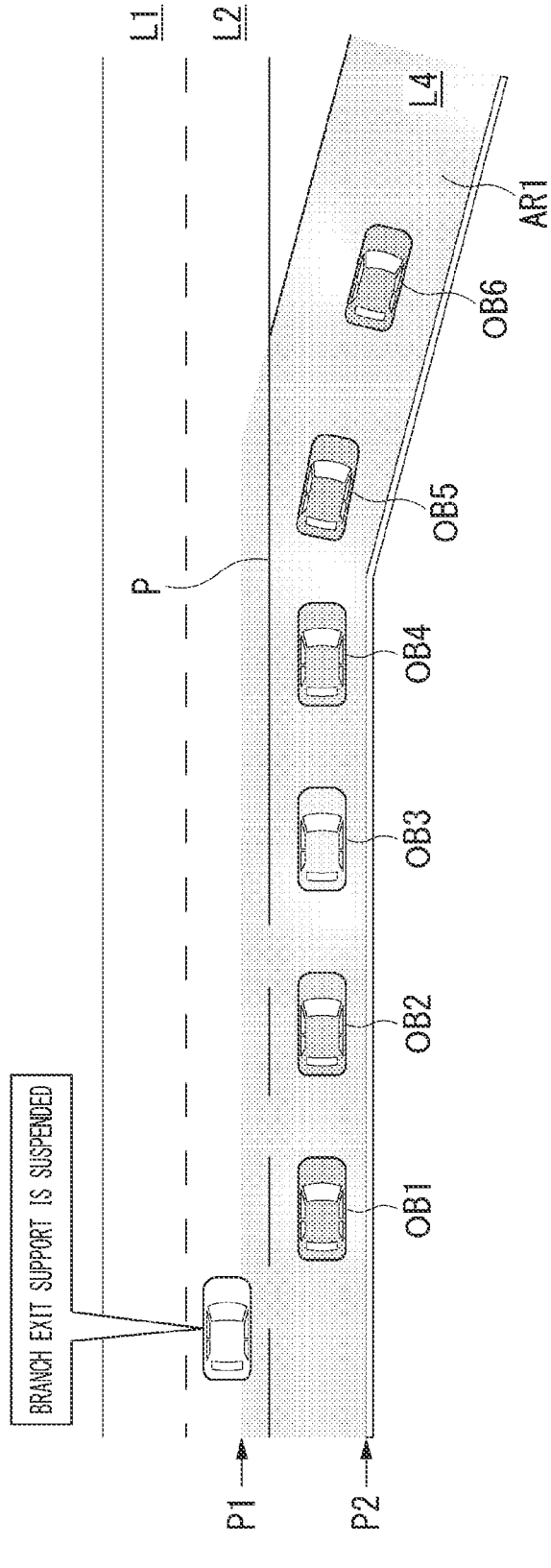
FIG. 15 is a view showing an example of a scene in which the branch lane is congested.

The driving support device 100 identifies vehicles within the search range AR1, and when the suspension conditions are satisfied, branch exit support is suspended at the tail end or in the vicinity of the tail end of the congested vehicles. FIG. 15 is a view showing an example of a scene in which the branch lane is congested. As shown in FIG. 15, when congestion has occurred in the search range AR1, the driving support device 100 suspends branch exit support when it reaches the vehicle OB1 at the tail end or when it reaches a location in the vicinity of the vehicle OB1.

As described above, since the driving support device 100 executes branch exit support suited to the situation of the search range even when congestion has occurred in the branch lane, favorable vehicle control for a driver can be realized.

In the foregoing example, the driving support device 100 judges whether or not branch exit support can be executed on the basis of whether or not the road shoulder is congested. However, in place of (or in addition to) this, when a predetermined kind of object (for example, a vehicle or a person) is present on the road shoulder or a predetermined number or more of objects are present on the road shoulder, branch exit support may be suspended. That is, the driving support device 100 determines whether or not the host vehicle M is caused to make a lane change from the traveling lane to the branch lane on the basis of the situation on the road shoulder. When it is determined to make a lane change, the host vehicle M is caused to automatically make a lane change, and when it is determined not to make a lane change, the host vehicle M is caused not to automatically make a lane change. Thus, favorable vehicle control for a driver can be realized.

According to the embodiment described above, the driving support device 100 determines whether or not to cause the host vehicle M to make a lane change from the traveling lane to the branch lane on the basis of a situation on the road shoulder in front of the branch lane (or the branch lane) when the host vehicle M is scheduled to proceed from the traveling lane in which the host vehicle M is traveling to the branch lane branching from the traveling lane. When it is determined to make a lane change, the host vehicle M is caused to automatically make a lane change, and when it is determined not to make a lane change, the host vehicle M is caused not to automatically make a lane change. Thus, favorable vehicle control for a driver can be realized.

The embodiment described above can be expressed as follows.

A control device includes a storage device storing a program, and a hardware processor. The hardware processor is configured to execute the program stored in the storage device to execute processing of recognizing a surrounding situation of a vehicle, processing of controlling steering of the vehicle such that the vehicle proceeds along a route on the basis of the surrounding situation and the route along which the vehicle is scheduled to proceed, processing of determining whether or not to cause the vehicle to make a lane change from a traveling lane in which the vehicle is traveling to a branch lane branching from the traveling lane on the basis of a situation on a road shoulder in front of the branch lane when the vehicle is scheduled to proceed from the traveling lane to the branch lane, processing of causing the vehicle to automatically make the lane change when it is determined to make the lane change, and processing of causing the vehicle not to automatically make the lane change when it is determined not to make the lane change.

Hereinafter, forms for performing the present invention have been described using an embodiment, but the present invention is not limited to such an embodiment in any way, and various kinds of deformation and replacement can be added thereto within a range not departing from the gist of the present invention.

While a preferred embodiment of the invention has been described and illustrated above, it should be understood that this is exemplary of the invention and is not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle control device comprising:
a storage medium storing computer-readable instructions; and
at least one processor connected to the storage medium, wherein the processor executes the computer-readable instructions to:
recognize a surrounding situation of a vehicle;
control steering of the vehicle such that the vehicle proceeds along a route on a basis of the surrounding situation and the route along which the vehicle is scheduled to proceed;
determine whether or not a road shoulder in front of a branch lane branching from a traveling lane is congested on a basis of a situation on the road shoulder in front of the branch lane when the vehicle is scheduled to proceed from the traveling lane to the branch lane;
determine not to cause the vehicle to automatically make a lane change when it is determined that congestion has occurred and the vehicle has reached a location within a predetermined distance from a tail end of the congestion or when it is determined that the congestion has occurred and the vehicle has reached the tail end of the congestion; and
continue to not cause the vehicle to automatically make the lane change even when it is determined that the congestion has not occurred after it is determined to not cause the vehicle to automatically make the lane change.

2. The vehicle control device according to claim 1, wherein the processor executes the computer-readable instructions to:
acquire a situation of the congestion in a region of the road shoulder from a connection starting position between the traveling lane and the branch lane to a location in front at a first predetermined distance on a basis of the recognized surrounding situation.

3. The vehicle control device according to claim 2, wherein the processor executes the computer-readable instructions to:
set the first predetermined distance to a distance varying depending on a speed of the vehicle.

4. The vehicle control device according to claim 3, wherein the processor executes the computer-readable instructions to:
set the first predetermined distance to be longer as the speed of the vehicle increases.

5. The vehicle control device according to claim 1, wherein the processor executes the computer-readable instructions to:
continue to cause the vehicle not to automatically make the lane change until the vehicle passes a predetermined position in the branch lane even when it is determined that the congestion has not occurred after it is determined to cause the vehicle not to automatically make a lane change, and restart the processing of causing the vehicle to automatically make a lane change after having passed the predetermined position.

6. The vehicle control device according to claim 1, wherein the processor executes the computer-readable instructions to:
determine that the congestion has occurred when a predetermined number or more of different vehicles are present in a region of the road shoulder.

7. The vehicle control device according to claim 1, wherein the processor executes the computer-readable instructions to:
determine that the congestion has occurred when a plurality of different vehicles are present in a queue in a region of the road shoulder and a length of a convoy of the different vehicles present in the queue is equal to or longer than a second setting distance.

8. The vehicle control device according to claim 1, wherein the processor executes the computer-readable instructions to:
cause an information output device to output information notifying a driver of the vehicle of an operation of steering to be performed without causing the vehicle to automatically make the lane change when it is determined not to make the lane change.

9. A vehicle control method in which a computer executes processing of recognizing a surrounding situation of a vehicle,
processing of controlling steering of the vehicle such that the vehicle proceeds along a route on a basis of the surrounding situation and the route along which the vehicle is scheduled to proceed,
processing of determining whether or not a road shoulder in front of a branch lane branching from a traveling lane is congested on a basis of a situation on the road shoulder when the vehicle is scheduled to proceed from the traveling lane to the branch lane,
processing of determining not to cause the vehicle to automatically make a lane change when it is determined that congestion has occurred and the vehicle has reached a location within a predetermined distance from a tail end of the congestion or when it is determined that the congestion has occurred and the vehicle has reached the tail end of the congestion; and
processing of continuing to not cause the vehicle to automatically make the lane change even when it is determined that the congestion has not occurred after it is determined to not cause the vehicle to automatically make the lane change.

10. A non-transitory computer storage medium storing a program for causing a computer to execute
processing of recognizing a surrounding situation of a vehicle,
processing of controlling steering of the vehicle such that the vehicle proceeds along a route on a basis of the surrounding situation and the route along which the vehicle is scheduled to proceed,
processing of determining whether or not a road shoulder in front of a branch lane branching from a traveling lane is congested on a basis of a situation on the road shoulder when the vehicle is scheduled to proceed from the traveling lane to the branch lane, processing of determining not to cause the vehicle to automatically make a lane change when it is determined that congestion has occurred and the vehicle has reached a location within a predetermined distance from a tail end of the congestion or when it is determined that the congestion has occurred and the vehicle has reached the tail end of the congestion; and processing of continuing to not cause the vehicle to automatically make the lane change even when it is determined that the congestion has not occurred after it is determined to not cause the vehicle to automatically make the lane change.

* * * * *